(12) United States Patent
Kitajima et al.

(10) Patent No.: US 11,567,454 B2
(45) Date of Patent: Jan. 31, 2023

(54) ELECTROMECHANICAL TRANSDUCER AND ELECTRONIC TIMEPIECE

(71) Applicant: CITIZEN WATCH CO., LTD., Tokyo (JP)

(72) Inventors: Yasuo Kitajima, Saitama (JP); Kenji Shimoda, Tokyo (JP); Shinnosuke Sakata, Tokyo (JP); Daisuke Tokunaga, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 632 days.

(21) Appl. No.: 16/724,274

(22) Filed: Dec. 21, 2019

(65) Prior Publication Data

US 2020/0209809 A1 Jul. 2, 2020

(30) Foreign Application Priority Data

Dec. 28, 2018 (JP) .............................. JP2018-248242
Nov. 7, 2019 (JP) .............................. JP2019-202593

(51) Int. Cl.
| | | |
|---|---|---|
| *H01L 31/048* | (2014.01) |
| *H01L 31/18* | (2006.01) |
| *G04C 3/14* | (2006.01) |
| *H02N 1/08* | (2006.01) |
| *H02K 7/116* | (2006.01) |
| *G04C 10/00* | (2006.01) |
| *G04B 25/00* | (2006.01) |

(52) U.S. Cl.
CPC .............. *G04C 3/14* (2013.01); *G04C 10/00* (2013.01); *H02K 7/116* (2013.01); *H02N 1/08* (2013.01); *G04B 25/00* (2013.01)

(58) Field of Classification Search
CPC .............. H01L 31/0468; H01L 31/048; H01L 31/0481
See application file for complete search history.

(56) References Cited

FOREIGN PATENT DOCUMENTS

| JP | 2002-084726 A | 3/2002 |
| JP | 2006-047835 A | 2/2006 |
| JP | 2010-279201 A | 12/2010 |
| JP | 2017-069999 A | 4/2017 |

*Primary Examiner* — Muhammad S Islam
*Assistant Examiner* — Charles S Laughlin

(57) ABSTRACT

Provided is an electromechanical transducer to be detachably attached to an electronic device, the transducer including: first and second plates; a rotor rotating around a rotating shaft supported by the plates; a fixed substrate disposed between the plates and facing the rotor; a charged portion having sub-regions disposed on the rotor at intervals in a rotating direction thereof so as to face the fixed substrate; an opposing electrode disposed on the fixed substrate so as to face the rotor; an adjusting unit for adjusting sliding properties of the rotating shaft, the adjusting unit being provided for at least one of the plates; and a gear train coupled to the rotating shaft. The gear train transmits motive power generated by the rotor rotated by electric power of the electronic device to the electronic device or transmits motive power generated by a change in orientation of the electronic device to the rotor.

20 Claims, 12 Drawing Sheets

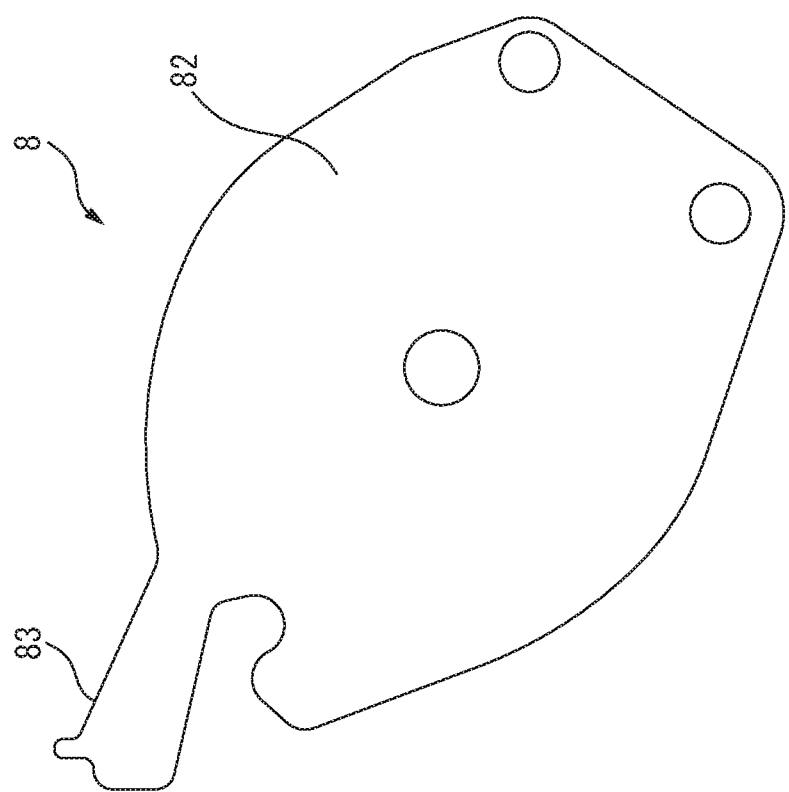
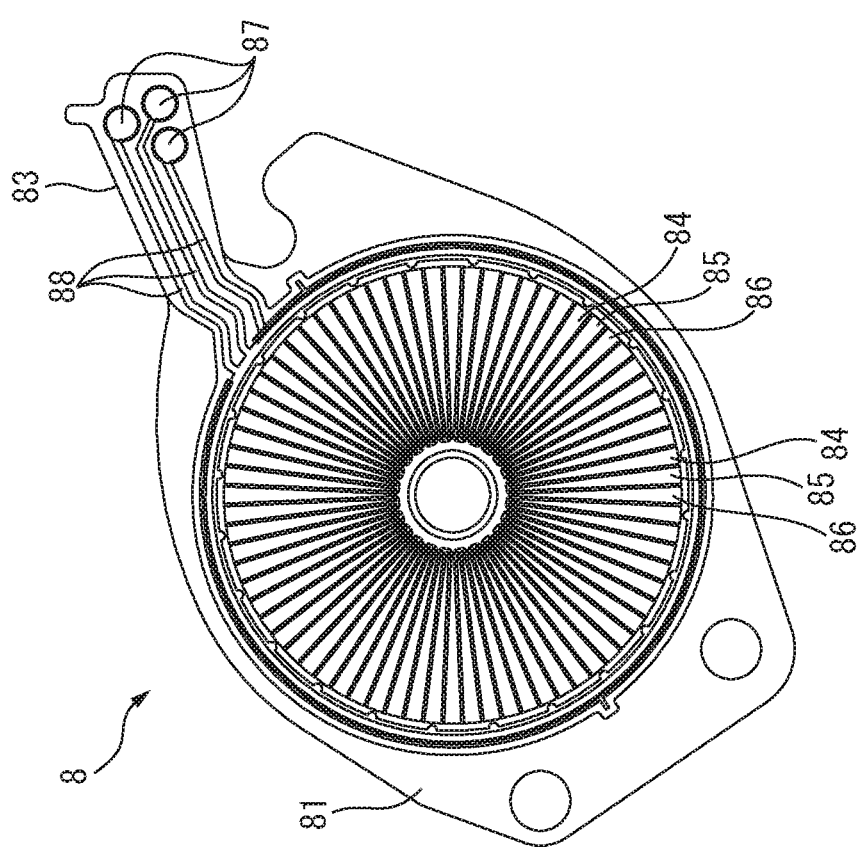
FIG. 6B
FIG. 6A

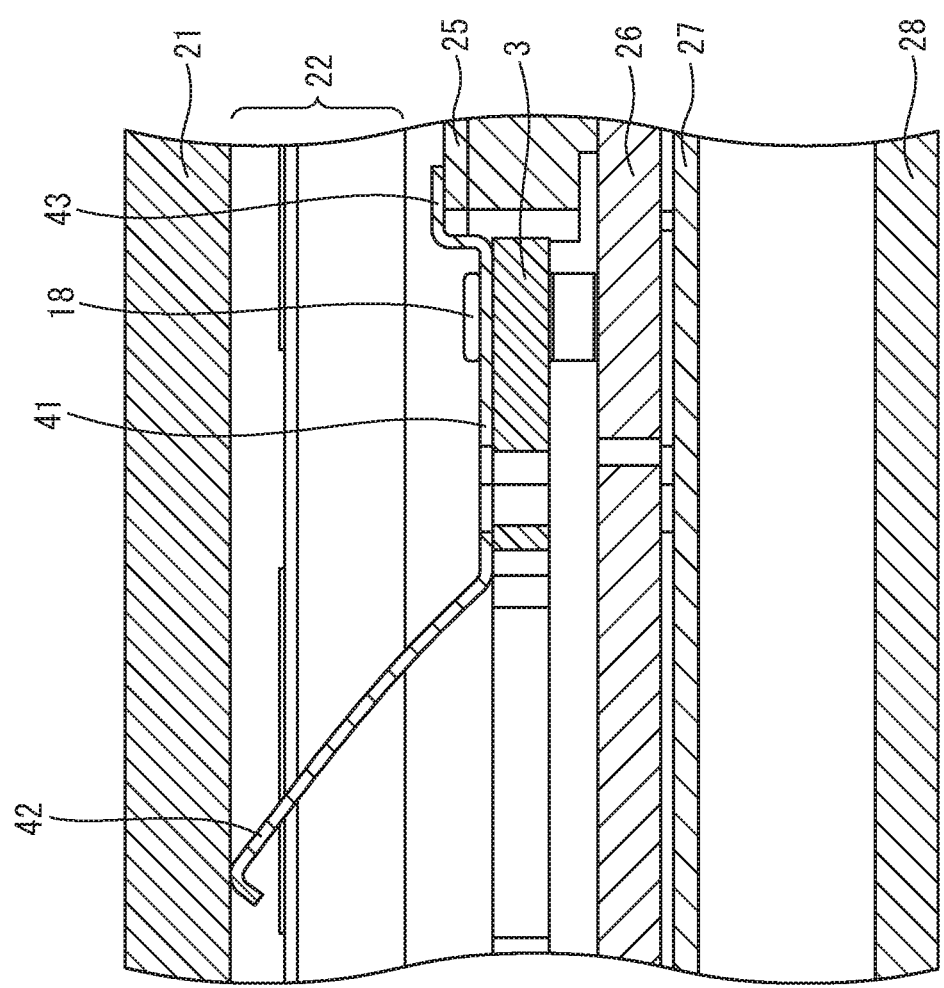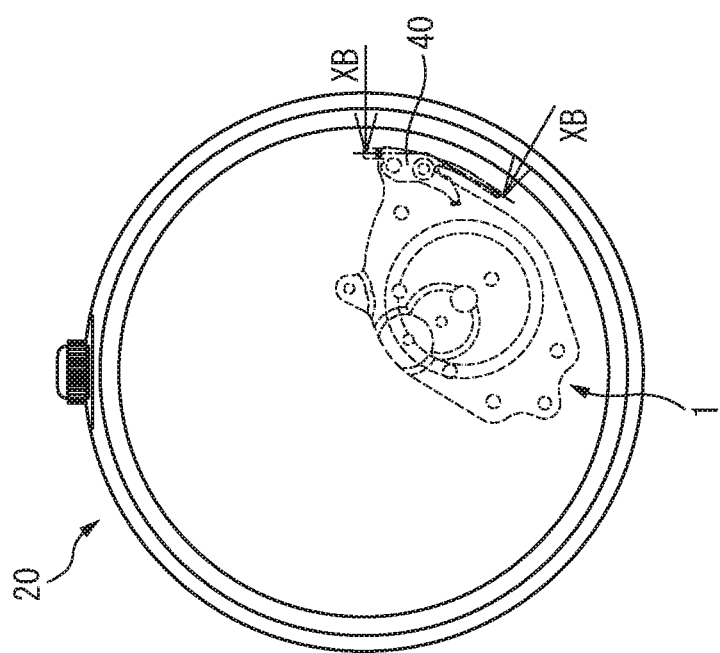

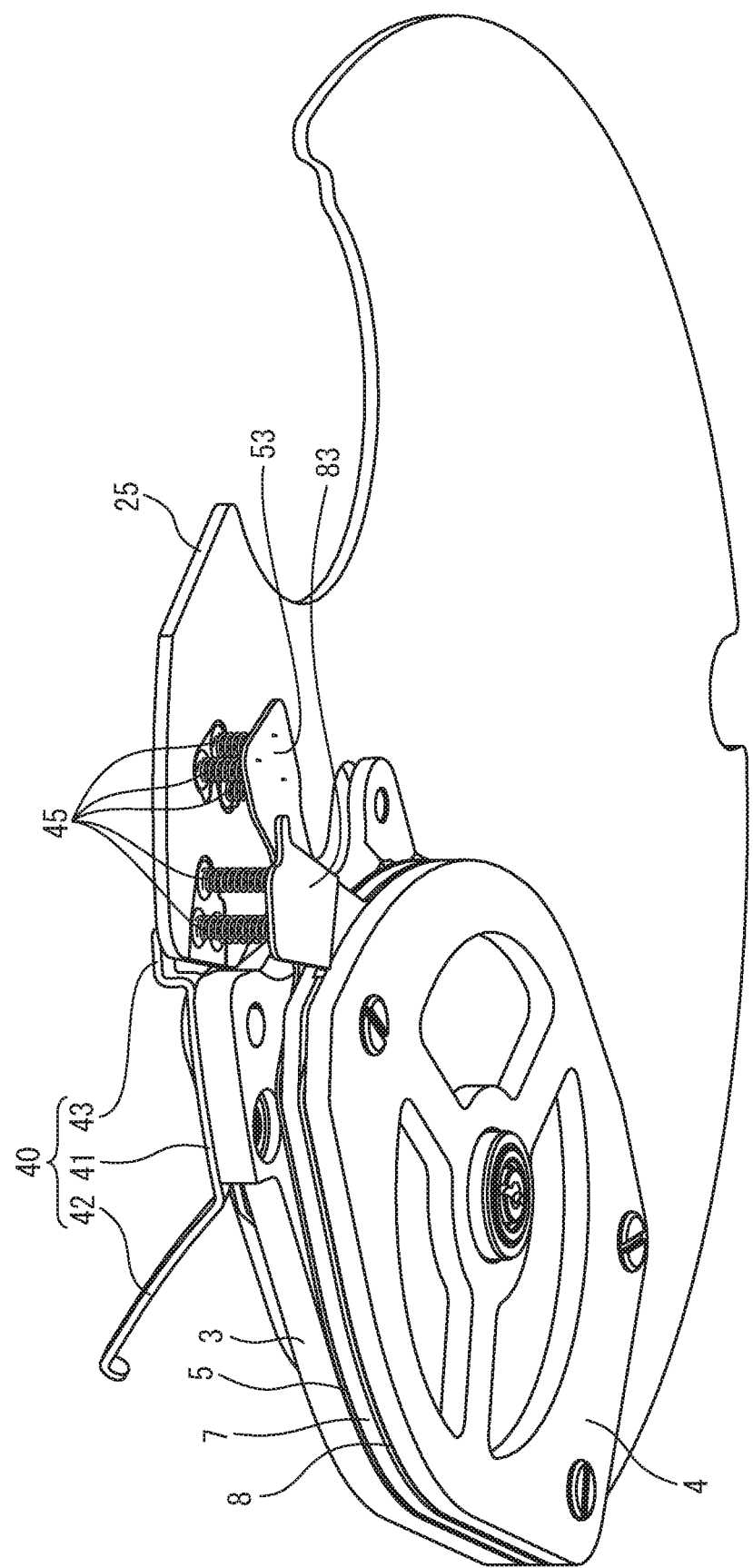

ELECTROMECHANICAL TRANSDUCER AND ELECTRONIC TIMEPIECE

CROSS REFERENCE TO RELATED APPLICATION

This application claims the benefit of Japanese Patent Application JP2018-248242 and JP2019-202593 filed on Dec. 28, 2018 and Nov. 7, 2019, respectively. The disclosure of JP2018-248242 and JP2019-202593 is herein incorporated by reference.

FIELD

The present invention relates to an electromechanical transducer and an electronic timepiece.

BACKGROUND

Electromechanical transducers, such as power generators generating electric power by electrostatic induction between relatively moving charged portions and opposing electrodes, and motors generating driving force from electrostatic force between such charged portions and opposing electrodes, are known (e.g., see JP2010-279201A and JP2017-069999A).

SUMMARY

Conventionally, in manufacturing an electronic device (e.g., electronic timepiece) including such an electromechanical transducer, components of the transducer, such as a fixed substrate, a rotor, a rotating shaft and a gear train transmitting motive power between the transducer and electronic device, are directly assembled in the housing of the electronic device. However, such direct assembly makes it difficult to check, during assembly, whether the rotor and fixed substrate are rubbing against each other due to warpage of the substrate or axial runout, for example, and thus leads to low workability. In an electromechanical transducer using electrostatic interaction between a charged portion and an opposing electrode respectively provided on a rotor and a fixed substrate, since it is important to dispose the rotor and substrate close to each other and to adjust their gap with high accuracy, low workability may result in low quality.

It is an object of the present invention to provide an electromechanical transducer which can be easily built into an electronic device and easily maintained at high quality, and to provide an electronic timepiece including the same.

Provided is an electromechanical transducer to be detachably attached to an electronic device, the electromechanical transducer including: a first plate; a second plate; a rotor rotating around a rotating shaft supported by the first and second plates; a fixed substrate disposed between the first and second plates and facing the rotor; a charged portion having sub-regions disposed on the rotor at intervals in a rotating direction thereof so as to face the fixed substrate; an opposing electrode disposed on the fixed substrate so as to face the rotor; an adjusting unit for adjusting sliding properties of the rotating shaft, the adjusting unit being provided for at least one of the first and second plates; and a gear train coupled to the rotating shaft, wherein the gear train transmits motive power generated by the rotor rotated by electric power of the electronic device to the electronic device or transmits motive power generated by a change in orientation of the electronic device to the rotor.

Preferably, the electromechanical transducer further includes a third plate between the first and second plates, wherein the gear train is disposed between the first and third plates while the rotor and the fixed substrate are disposed between the second and third plates.

Preferably, the adjusting unit includes an adjusting screw for adjusting the position of the rotating shaft in the longitudinal direction of the rotating shaft, and a resin portion surrounding the adjusting screw and having a thread formed by insertion of the adjusting screw to fix the adjusting screw. Also preferably, the adjusting unit is provided for each of the first and second plates.

Provided is an electromechanical transducer using electrostatic interaction between a charged portion and an opposing electrode to perform transduction between electric and motive power, the electromechanical transducer including a first plate, a second plate, a third plate between the first and second plates, a fixed substrate between the second and third plates, a rotor facing the fixed substrate and rotating around a rotating shaft, a charged portion having sub-regions disposed on the rotor at intervals in a rotating direction thereof so as to face the fixed substrate, an opposing electrode disposed on the fixed substrate so as to face the rotor, and a gear train disposed between the first and third plates and coupled to the rotating shaft.

Preferably, the electromechanical transducer further includes a second fixed substrate disposed between the second and third plates on the side opposite to the fixed substrate with respect to the rotor, a second charged portion having sub-regions disposed on the rotor at intervals in the rotating direction so as to face the second fixed substrate, and a second opposing electrode disposed on the second fixed substrate so as to face the rotor.

Preferably, gears constituting the gear train rotate around second rotating shafts different from the rotating shaft, and the second rotating shafts are rotatably supported by the first and third plates at positions covered by a rotation area of the rotor as viewed from above.

Preferably, the rotating shaft of the rotor passes through the third plate and is rotatably supported by the first and second plates.

Preferably, the electromechanical transducer further includes a spacer surrounding the rotor and sandwiched between the fixed substrate and the second fixed substrate, the spacer being at least partially translucent or transparent, wherein the rotor is visible through the spacer from an area beside the first and third plates.

Provided is an electronic timepiece including: any one of the above electromechanical transducers; a circuit board including circuitry for applying an alternating voltage to the opposing electrode to generate electrostatic force between the charged portion and the opposing electrode, thereby rotating the rotor and the gear train; and a movement coupled to the gear train and driving a hand by motive power generated by rotation of the rotor.

Provided is an electronic timepiece including: a rotary weight having an uneven weight balance and rotated by external force; any one of the above electromechanical transducers, wherein the gear train is directly or indirectly coupled to a rotating shaft of the rotary weight; a circuit board including circuitry for storing electric power generated by electrostatic induction between the charged portion and the opposing electrode when the rotor is rotated by rotational energy of the rotary weight; and a movement using the stored electric power to drive a hand.

Preferably, the electronic timepiece further includes a conductive member for grounding the circuit board to a case back of the electronic timepiece, the conductive member including a rigid portion disposed on the third plate, an arm portion extending from the rigid portion to the case back in an outer area inside the electronic timepiece, and a holding conductive portion extending from the rigid portion to a conductive portion of the circuit board and holding the circuit board.

Preferably, the rigid portion is fixed to the third plate by a screw, and the third plate, and the rigid portion and a top part of the screw projecting from a surface of the third plate are further from the case back in the thickness direction of the electronic timepiece than a surface of the circuit board facing the case back.

Preferably, the screw fixes the conductive member to the electromechanical transducer and also fixes the electromechanical transducer to the movement.

BRIEF DESCRIPTION OF THE DRAWINGS

Other features and advantages of the present invention will be apparent from the ensuing description, taken in conjunction with the accompanying drawings, in which:

FIGS. 6A and 6B are plan views showing the upper surface 81 and lower surface 82 of the lower substrate 8;

FIGS. 10A and 10B are a schematic plan and cross-sectional views of the electronic timepiece 20;

FIG. 12 is a perspective view for explaining electrical paths connecting the module 1 and circuit board 25.

DESCRIPTION OF EMBODIMENTS

Hereinafter, with reference to the accompanying drawings, an electromechanical transducer and an electronic timepiece will be explained in detail. However, note that the present invention is not limited to the drawings or the embodiments described below.

Figure 1:
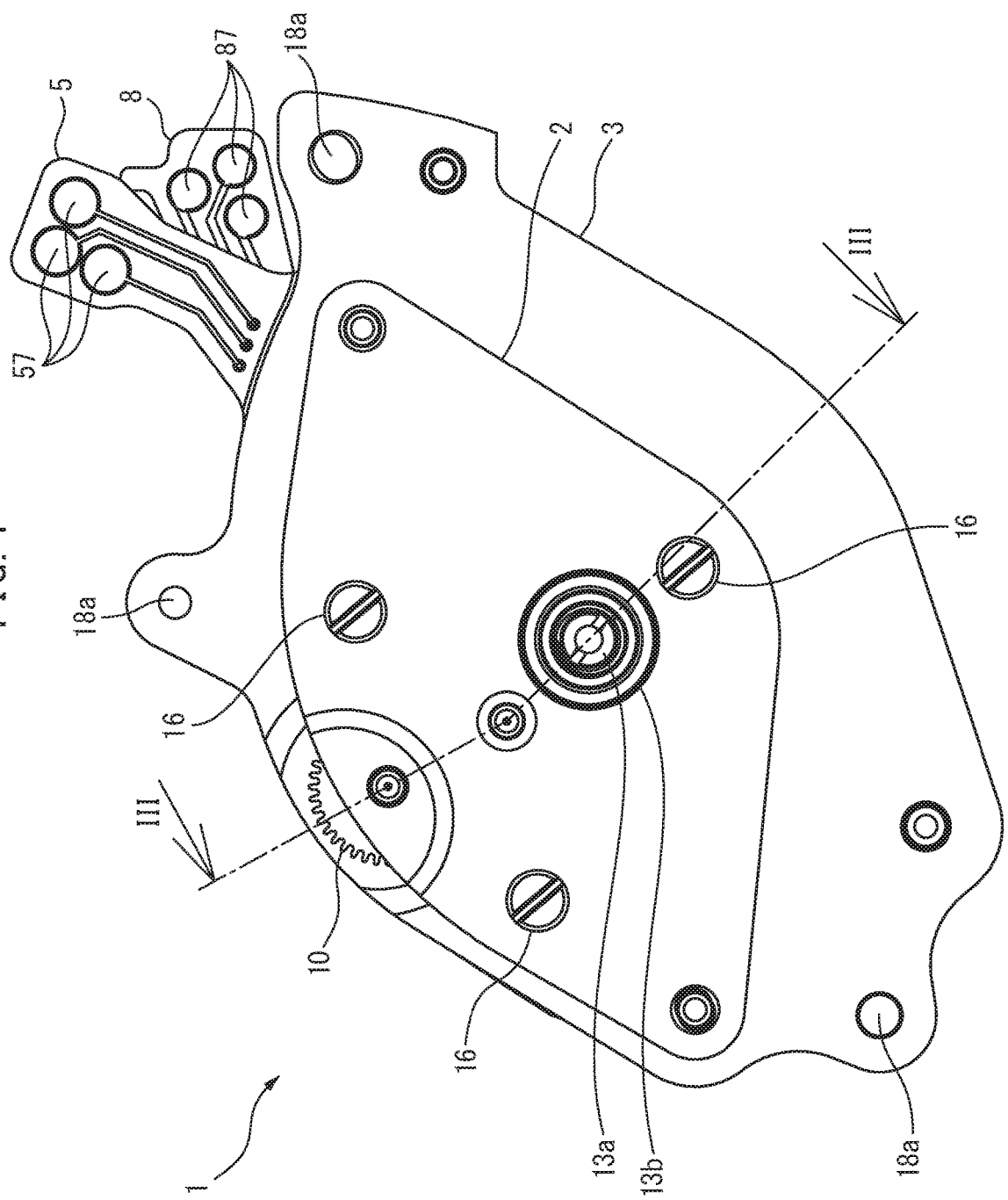
FIG. 1 is a plan view of an electrostatic transducer module 1.
Figure 2:
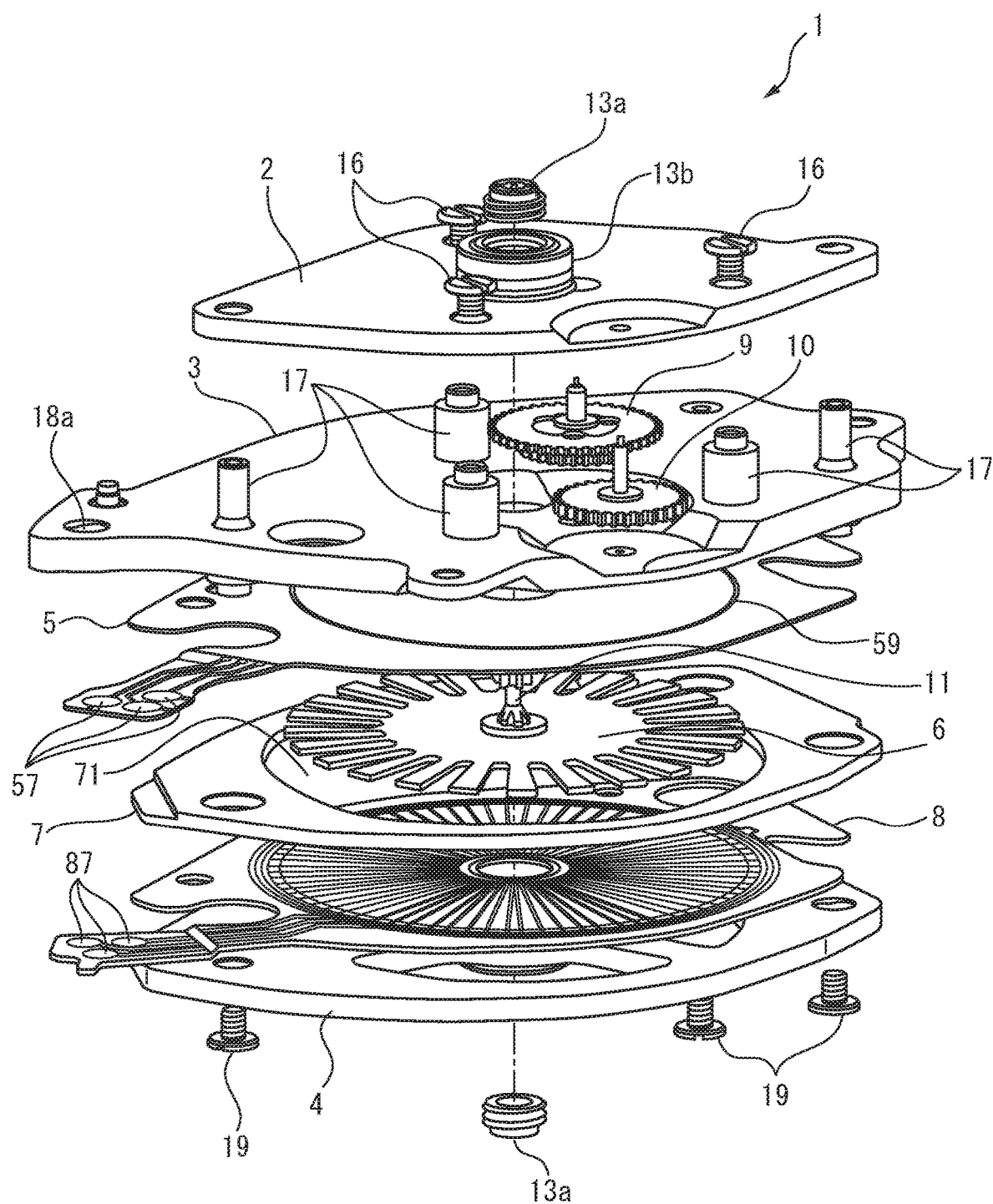
FIG. 2 is an exploded perspective view of the module 1.
Figure 3:
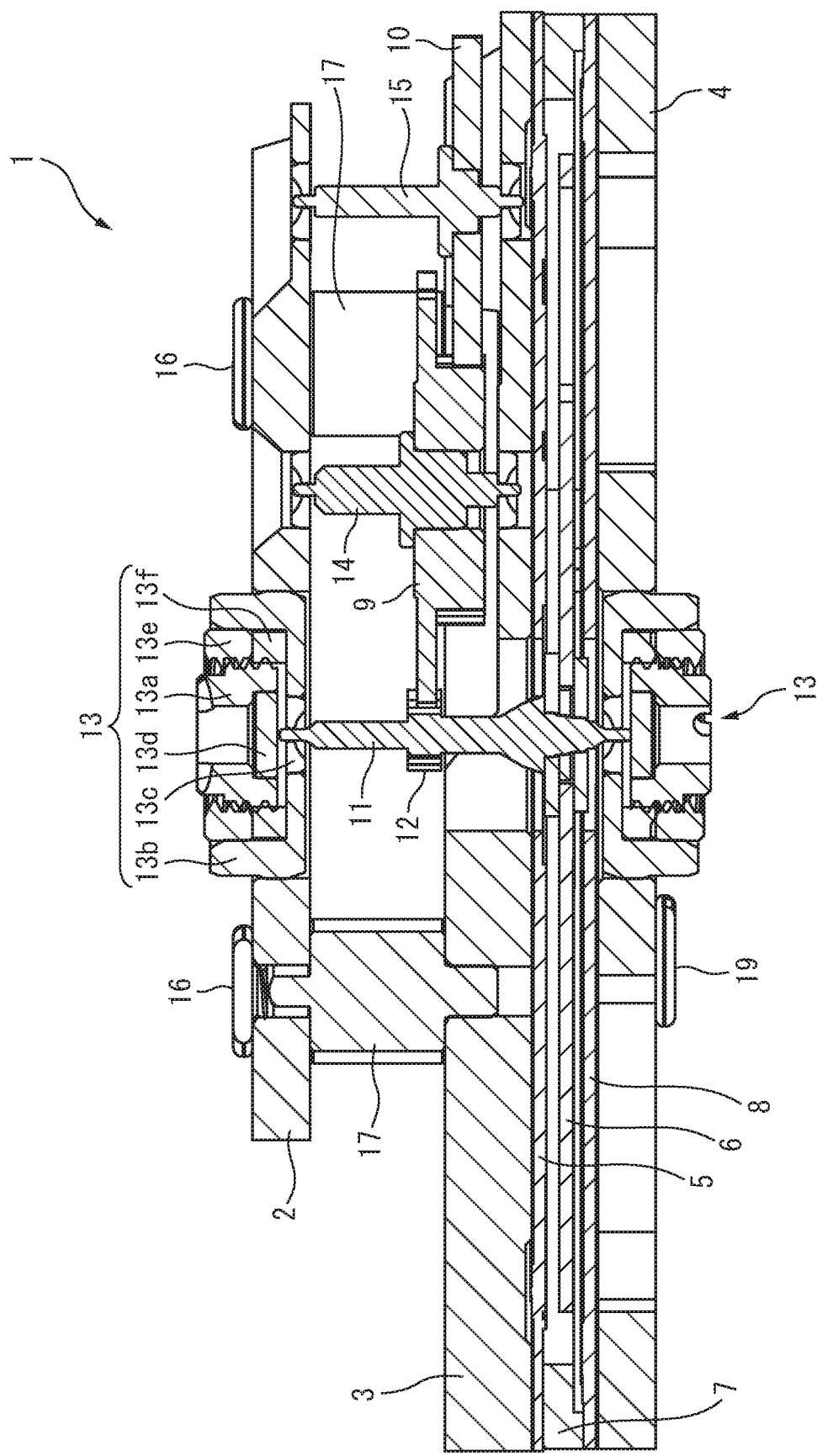
FIG. 3 is a cross-sectional view of the module 1.

FIGS. 1-3 are a plan view, an exploded perspective view and a cross-sectional view of an electrostatic transducer module 1, respectively. FIG. 3 shows a cross section of the module 1 taken along line III-III of FIG. 1.

The module 1 is an example of the electromechanical transducer to be detachably attached to an electronic device, and includes an upper plate 2, a middle plate 3 and a lower plate 4 parallel to each other. Between the middle plate 3 and lower plate 4, the module 1 includes an electrostatic transducer mechanism generating motive power by electrostatic force or electric power by electrostatic induction, and uses electrostatic interaction between its charged portions and opposing electrodes to perform electrostatic transduction between electric and motive power. Between the upper plate 2 and middle plate 3, the module 1 also includes a gearing mechanism transmitting motive power between the transducer mechanism and the outside of the module. In other words, the module 1 has a two-layer structure wherein the transducer mechanism functioning as a power generator or motor and the gearing mechanism driving the transducer by external force or transmitting motive power generated in the transducer to the outside are integrated (unitized).

The upper plate 2, middle plate 3 and lower plate 4, which are an example of the first, third and second plates, respectively, are three flat members layered parallel to each other. The upper plate 2 and lower plate 4 are disposed at the top and bottom in the thickness direction of the module 1, respectively, while the middle plate 3 is disposed between the upper plate 2 and lower plate 4. Of these three plates, the middle plate 3 is the largest; the lower plate 4 is slightly smaller than the middle plate 3; and the upper plate 2 is the smallest. As shown in FIG. 1, the upper plate 2 is disposed so as not to project outside the middle plate 3 as viewed from above, and is fixed to supports 17 on the upper side of the middle plate 3 by screws 16. There is a gap as large as the height of the supports 17 between the upper plate 2 and middle plate 3; the gearing mechanism is disposed in this gap. The lower plate 4 is fixed to the lower side of the middle plate 3 by screws 19 with the transducer mechanism sandwiched therebetween. Reference numeral 18a indicates screw holes used for building the module 1 into an electronic device, such as an electronic timepiece.

As shown in FIG. 2, the module 1 includes an upper substrate 5, a rotor 6, a spacer 7, a lower substrate 8 and a rotating shaft 11, as the transducer mechanism. The upper substrate 5, rotor 6 and lower substrate 8 are disposed parallel to each other in this order from the side of the middle plate 3.

Figure 4B:
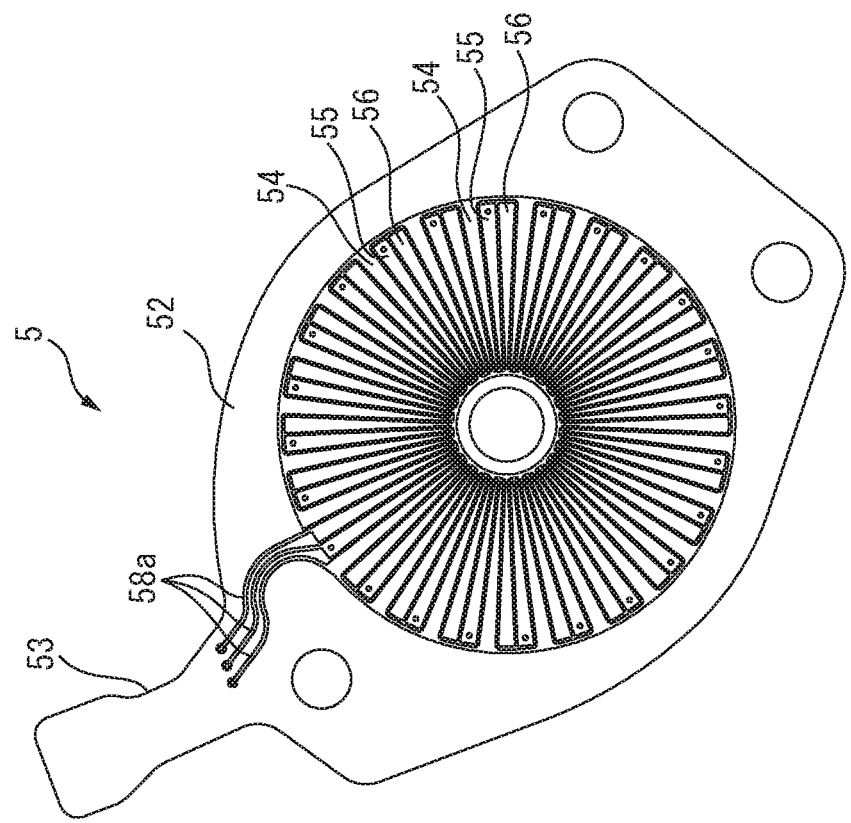
FIGS. 4A and 4B are plan views showing the upper surface 51 and lower surface 52 of the upper substrate 5.
Figure 4A:
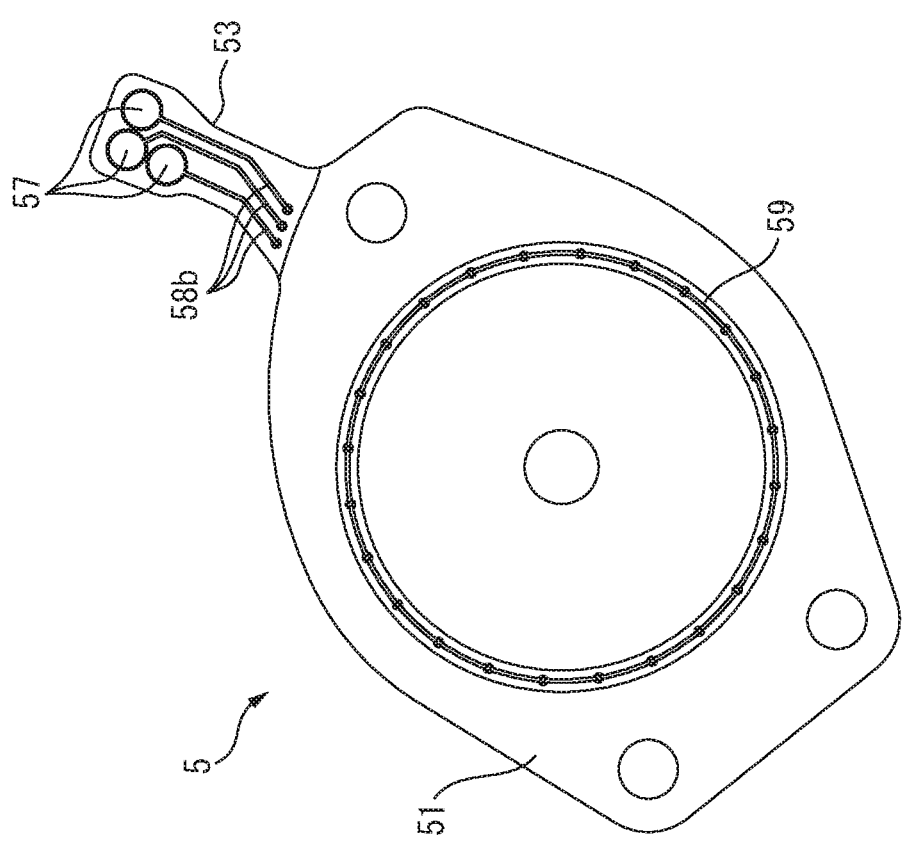

FIGS. 4A and 4B are plan views showing the upper surface 51 and lower surface 52 of the upper substrate 5, respectively. The upper substrate 5, which is an example of the fixed substrate (first fixed substrate), is made of a well-known substrate material, such as a glass epoxy substrate, and disposed close to the middle plate 3 between the middle plate 3 and lower plate 4. As shown in FIG. 4B, opposing electrodes 54-56 are formed on the lower surface 52 of the upper substrate 5, which is the surface facing the rotor 6.

The opposing electrodes 54-56 are an example of first opposing electrodes, each composed of substantially trapezoidal sub-regions having the same shape and size. These sub-regions are disposed radially and alternately in the circumferential direction in the order of the opposing electrodes 54, 55, 56 in a circular region of the lower surface 52 covered by the rotor 6 as viewed from above. The sub-regions of the opposing electrode 54 are connected to each other on the lower surface 52, and so are those of the opposing electrode 56. The sub-regions of the opposing electrode 55 are connected to each other via through-holes provided in the respective sub-regions and a circular conductive pattern 59 formed on the upper surface 51. The opposing electrodes 54-56 are connected to three connecting terminals 57 on the upper surface 51 of a projecting portion 53 of the upper substrate 5 via three leads 58a on the lower surface 52 and three leads 58b on the upper surface 51, respectively. The connecting terminals 57 are connected to a circuit board in an electronic device into which the module 1 is built (an example where the module 1 is built into an electronic timepiece is shown in FIG. 12 described later).

The number of first opposing electrodes is not limited to three, but may be any number. Unlike the illustrated example, the opposing electrodes 55, 56 may be omitted and only the opposing electrode 54 may be left as a first opposing electrode, for example.

Figure 5B:
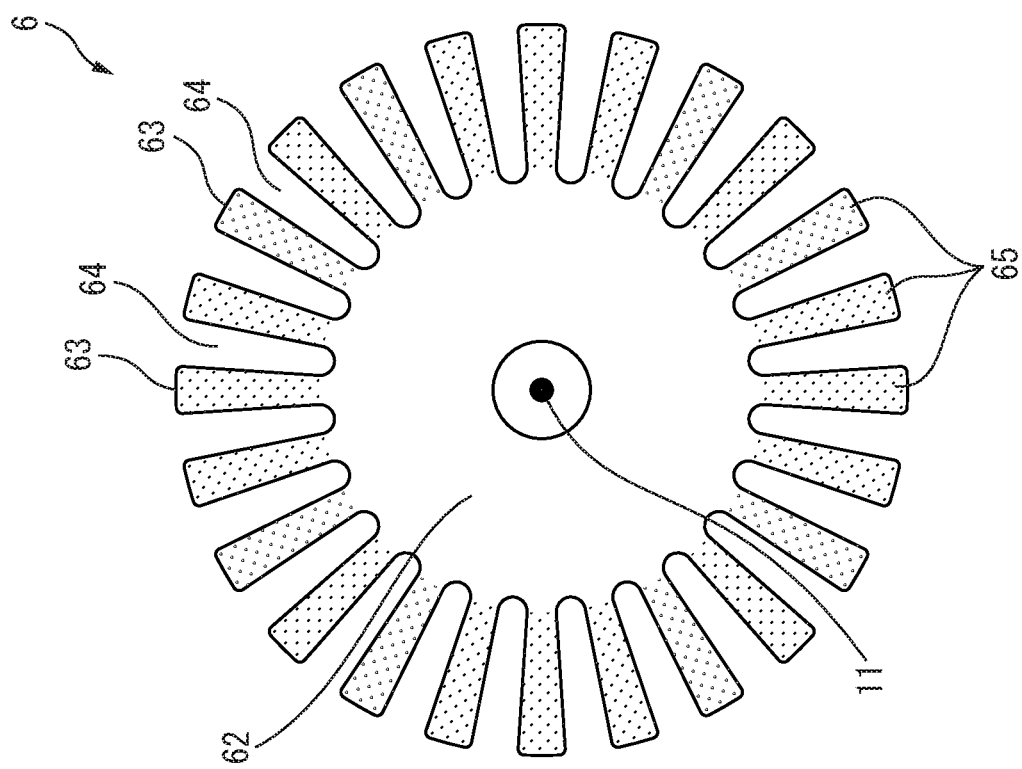
FIGS. 5A and 5B are plan views showing the upper surface 61 and lower surface 62 of the rotor 6.
Figure 5A:
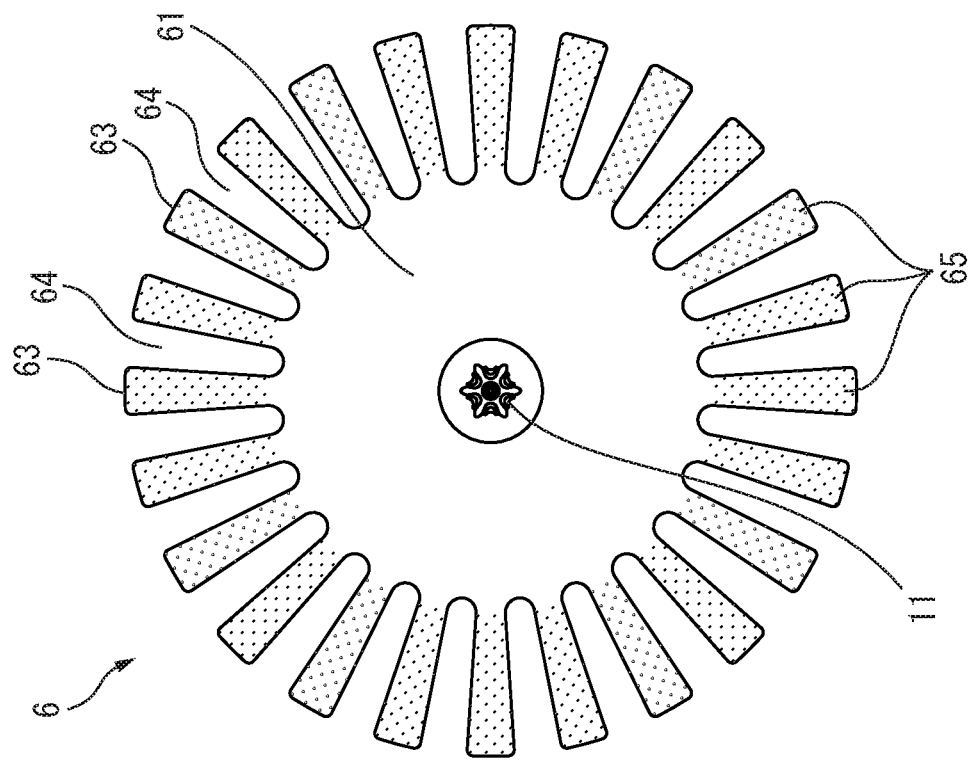

FIGS. 5A and 5B are plan views showing the upper surface 61 and lower surface 62 of the rotor 6, respectively. The rotor 6 is a substantially disk-shaped member made of a metal, such as aluminum or an alloy thereof, or glass or silicon, and is disposed between the upper substrate 5 and lower substrate 8. The rotor 6 has the center fixed to the rotating shaft 11, and rotates clockwise or anticlockwise together with the rotating shaft 11. For the purpose of weight reduction, as shown in FIGS. 5A and 5B, the rotor 6 has evenly spaced grooves 64 in its outer portion, but is regarded as disk-shaped if the grooves 64 are disregarded. Each groove 64 extends in the radial direction from the outer portion of the rotor 6 to its center (the rotating shaft 11). In the outer portion, the grooves 64 alternate with projecting portions 63 which are portions other than the grooves 64, in the circumferential direction. The projecting portions 63 and grooves 64 have the same width on the same circumference.

The rotor 6 has charged portions 65 on the upper surface 61 and lower surface 62 of the projecting portions 63. The grooves 64 divide the charged portions 65 into sub-regions disposed at intervals in the circumferential direction on the upper surface 61 and lower surface 62, which are surfaces facing the upper substrate 5 and lower substrate 8, respectively. The charged portions 65 are thin films made of an electret material, carry electrostatic charge, and all have the same polarity (e.g., negatively charged). Examples of the electret material include: a resin material, such as CYTOP (registered trademark); a polymeric material, such as polypropylene (PP), polyethylene terephthalate (PET), polyvinyl chloride (PVC), polystyrene (PS), polytetrafluoroethylene (PTFE), polyvinylidene difluoride (PVDF) or polyvinyl fluoride (PVF); and an inorganic material, such as silicon oxide ($SiO_2$) or silicon nitride (SiN).

The charged portions 65 may be formed only on the projecting portions 63, or formed not only on the projecting portions 63, but also on an annular portion of the rotor 6 closer to the center than the projecting portions 63 and grooves 64. In the latter case, since it is not necessary to form the charged portions 65 only on the projecting portions 63, the rotor 6 can be easily manufactured. In this case, the annular portion of the rotor 6 may be charged.

The rotating shaft 11 is a center axis of rotation of the rotor 6, passes through the middle plate 3, upper substrate 5, rotor 6 and lower substrate 8, and is rotatably supported by the upper plate 2 and lower plate 4. Although the rotor 6 rotates below the middle plate 3 (on the side of the lower plate 4), supporting the rotating shaft 11 by the upper plate 2 and lower plate 4 to extend the distance between the supported points is more advantageous for the purpose of preventing inclination of the rotating shaft 11 and rotor 6 than supporting it by the middle plate 3 and lower plate 4, and also stabilizes engagement between gears constituting the gearing mechanism described later.

As shown in FIG. 3, an adjusting unit 13 for adjusting the vertical (longitudinal) position of the rotating shaft 11 to adjust its sliding properties is provided at upper and lower tenons of the rotating shaft 11. The adjusting unit 13 includes an adjusting screw 13a, an adjuster case 13b, a hole jewel 13c, a cap jewel 13d, an internal screw 13e and a resin portion 13f. The adjusting screw 13a is used for adjusting the vertical position of the rotating shaft 11, and is disposed on an extension line of the rotating shaft 11 in the adjuster case 13b.

The adjuster case 13b has a recess containing the adjusting screw 13a, cap jewel 13d, internal screw 13e and resin portion 13f, and is fixed to the upper plate 2 or lower plate 4 with its bottom facing the middle plate 3. The adjuster case 13b has an opening at the center of its bottom; the hole jewel 13c is inserted into that opening and is fixed to the adjuster case 13b. The hole jewel 13c has a center hole through which the end of the rotating shaft 11 passes, and positions the rotating shaft 11 in the plane perpendicular to the longitudinal direction of the rotating shaft 11. The cap jewel 13d is fixed to the lower end of the adjusting screw 13a, and in contact with the end face of the rotating shaft 11 to position the rotating shaft 11 in the vertical direction. The vertical position of the rotating shaft 11 is determined, depending on the relative position between the adjusting screw 13a and adjuster case 13b, i.e., the depth of insertion of the adjusting screw 13a into the adjuster case 13b.

The internal screw 13e and resin portion 13f are annular members fixed to the adjuster case 13b so that the respective outer circumferential surfaces are in contact with the inner wall of the adjuster case 13b, and fix the adjusting screw 13a to the adjuster case 13b. A thread matching the adjusting screw 13a is provided for the internal screw 13e in advance, but is not provided for the resin portion 13f prior to assembling the adjusting unit 13; the thread is formed on the resin portion 13f by inserting the adjusting screw 13a. Since the resin portion 13f is provided with a thread matching the corresponding adjusting screw 13a, the resin portion 13f fixes the adjusting screw 13a more strongly than the internal screw 13e. The resin portion 13f also prevents the adjusting screw 13a from loosening on impact so as not to cause a decrease in performance of the transducer mechanism when the module 1 is being built into an electronic device and when the electronic device including the module is used.

Adjusting the vertical position of the rotating shaft 11 (i.e., of the rotor 6) with the adjusting screw 13a allows for adjusting the gaps between the upper substrate 5, rotor 6 and lower substrate 8 so that the rotation center of the rotor 6 is at or near the midpoint between the upper substrate 5 and lower substrate 8. Providing both the upper plate 2 and lower plate 4 with the adjusting unit 13 allows for adjusting the distances between the rotor 6 and the upper substrate 5 and lower substrate 8; these distances will not vary even if the orientation of the module 1 is changed, which leads to stable power generation or motor driving. The adjusting unit 13 is preferably provided for each of the upper plate 2 and lower plate 4, but may be provided for only one of them. Even in the latter case, adjusting sliding properties of the rotating shaft 11 with the adjusting unit 13 allows for reducing unnecessary sliding load; thus, a decrease in power consumption and an increase in torque can be achieved if the module 1 is a motor, and efficiency of power generation is improved if the module 1 is a power generator.

The spacer 7 is a resin member molded so as to surround the rotor 6 and fill the space between the upper substrate 5 and lower substrate 8 except for the rotation area of the rotor 6. As shown in FIG. 2, the spacer 7 has a central opening 71 where the rotor 6 is disposed. The spacer 7 is preferably translucent to such an extent that the position of the rotor 6 can be visually checked through the spacer 7 from an area beside the module 1, and is more preferably transparent. However, it is only necessary that at least a segment of the loop-shaped spacer 7 be translucent, and the rest may be opaque. Alternatively, a segment of the spacer 7 may be cut or recessed so that the position of the rotor 6 can be checked. The spacer 7 has the effect of keeping the gap between the upper substrate 5 and lower substrate 8 constant so that it may not become too small, and the effect of preventing dust from entering the rotation area.

FIGS. 6A and 6B are plan views showing the upper surface 81 and lower surface 82 of the lower substrate 8, respectively. The lower substrate 8, which is an example of the fixed substrate (second fixed substrate), is made of a well-known substrate material similarly to the upper substrate 5, and disposed close to the lower plate 4 between the middle plate 3 and lower plate 4 (i.e., on the side opposite to the upper substrate 5 with respect to the rotor 6). As shown in FIG. 6A, opposing electrodes 84-86 are formed on the upper surface 81 of the lower substrate 8, which is the surface facing the rotor 6.

The opposing electrodes 84-86 are an example of second opposing electrodes, each composed of substantially trapezoidal sub-regions having the same shape and size. These sub-regions are disposed radially and alternately in the circumferential direction in the order of the opposing electrodes 84, 85, 86 in a circular region of the upper surface 81 covered by the rotor 6 as viewed from above. The sub-regions constituting each of the opposing electrodes 84-86 are connected to each other on the upper surface 81. The opposing electrodes 84-86 are connected to three connecting terminals 87 on the upper surface 81 of a projecting portion 83 of the lower substrate 8 via three leads 88, respectively. The connecting terminals 87 are connected to a circuit board in an electronic device into which the module 1 is built (see FIG. 12).

The number of second opposing electrodes is not limited to three, but may be any number. Unlike the illustrated example, the opposing electrodes 85, 86 may be omitted and only the opposing electrode 84 may be left as a second opposing electrode, for example.

In the module 1, the charged portion 65 on the upper surface 61 of the rotor 6 faces the opposing electrodes 54-56 on the lower surface 52 of the upper substrate 5, while the charged portion 65 on the lower surface 62 of the rotor 6 faces the opposing electrodes 84-86 on the upper surface 81 of the lower substrate 8. However, the charged portions 65 may be provided only on one of the surfaces of the rotor 6, and only one of the upper substrate 5 and lower substrate 8 may be disposed so that the opposing electrodes face the charged portion 65. In this case, the other of the upper substrate 5 and lower substrate 8 may be omitted.

As shown in FIGS. 2 and 3, the module 1 includes a pinion 12, gears 9, 10 and rotating shafts 14, 15, as the gearing mechanism. The pinion 12 is a gear attached to the rotating shaft 11 between the upper plate 2 and middle plate 3. The gears 9, 10 are also disposed between the upper plate 2 and middle plate 3, rotate around the rotating shafts 14, 15, respectively, and are coupled to the pinion 12 and gear 9, respectively. Part of the gear 10 is placed outside the edge of the upper plate 2, as shown in FIG. 1. The rotating shafts 14, 15 are an example of the second rotating shafts, and rotatably supported by the upper plate 2 and middle plate 3 at positions covered by the rotation area of the rotor 6 as viewed from above. The gears 9, 10 are an example of the gear train coupled to the rotating shaft 11.

The rotor 6 of the module 1 has a relatively large diameter so as to generate large driving force or a large amount of power. In order to couple the gear train of the module 1 to a gear train of a target electronic device, it is conceivable to attach a large gear to the rotating shaft 11; however, this increases the moment of inertia of the rotating shaft 11 and decreases the performance. Thus, the module 1 includes the rotating shafts 14, 15 immediately above the rotation area of the rotor 6 (at positions covered by that area as viewed from above) so as to interpose the pinion 12 and gears 9, 10 having smaller diameters than the rotor 6; thereby, the gear train is extended to the outside of the rotation area of the rotor 6.

When the module 1 is used as a motor, alternating voltages having different phases are applied to the opposing electrodes 54, 84, opposing electrodes 55, 85 and opposing electrodes 56, 86 via the connecting terminals 57, 87 from the electronic device into which the module 1 is built. Then, interaction between the electric fields generated by the charged portions 65 and by the opposing electrodes 54-56, 84-86 generates attraction or repulsion between the charged portions 65 and opposing electrodes 54-56, 84-86. Applying three-phase alternating voltages to the opposing electrodes 54-56, 84-86 generates electrostatic force between the charged portions 65 and opposing electrodes 54-56, 84-86, and that force rotates the rotor 6; thus, the driving force is obtained via the rotating shaft 11, pinion 12 and gears 9, 10. If the electronic device is an electronic timepiece, the driving force is transmitted to a hand.

Instead of the three sets of electrodes, two sets of electrodes may be alternately disposed on each of the upper substrate 5 and lower substrate 8; in this case, these electrodes may be supplied with alternating voltages whose polarities are alternately reversed. In other words, when the module 1 is used as a motor, the gears 9, 10 transmit motive power to the electronic device into which the module 1 is built, the motive power being generated by the rotor 6 rotated by electric power of the electronic device.

When the module 1 is used as a power generator, motive power is generated by external force, for example, in the electronic device into which the module 1 is built, thereby driving the gear 10 to rotate the gear 9 and pinion 12 coupled to the gear 10. Then, the rotor 6 rotates together with the rotating shaft 11, which increases and decreases the overlapping area between the charged portions 65 and opposing electrodes 54-56, 84-86. If the charged portions 65 carry negative charge, for example, the rotation of the rotor 6 increases and decreases positive charge attracted to the opposing electrodes 54-56, 84-86. In this way, an alternating current is generated between the opposing electrodes 54-56, 84-86 to generate electric power by electrostatic induction. In other words, when the module 1 is used as a power generator, the gears 9, 10 transmit motive power to the rotor 6, the motive power being generated, for example, by a change in orientation of the electronic device into which the module 1 is built.

Since the transducer mechanism and gearing mechanism are integrated (unitized), the module 1 can be easily built into (assembled in) an electronic device and easily maintained at high quality. In general, it is necessary to check and adjust the gap between the rotor and fixed substrate during assembly of an electromechanical transducer; however, the module 1 can be singly assembled, and thus needs less man-hour than an electromechanical transducer directly assembled in an electronic device.

Without the gears 9, 10, it is necessary to assemble a gear train between the electrostatic transducer module and electronic device after the module is attached to the electronic device, which makes detachment of the module difficult; however, since the module 1 includes the small gears 9, 10, it can be easily attached to and detached from an electronic device. In particular, when the module 1 is used as a motor, reduction in rotation of the rotor 6 by the small gears 9, 10 minimizes loss of torque caused by engagement with a gear train of the electronic device.

Figure 7:
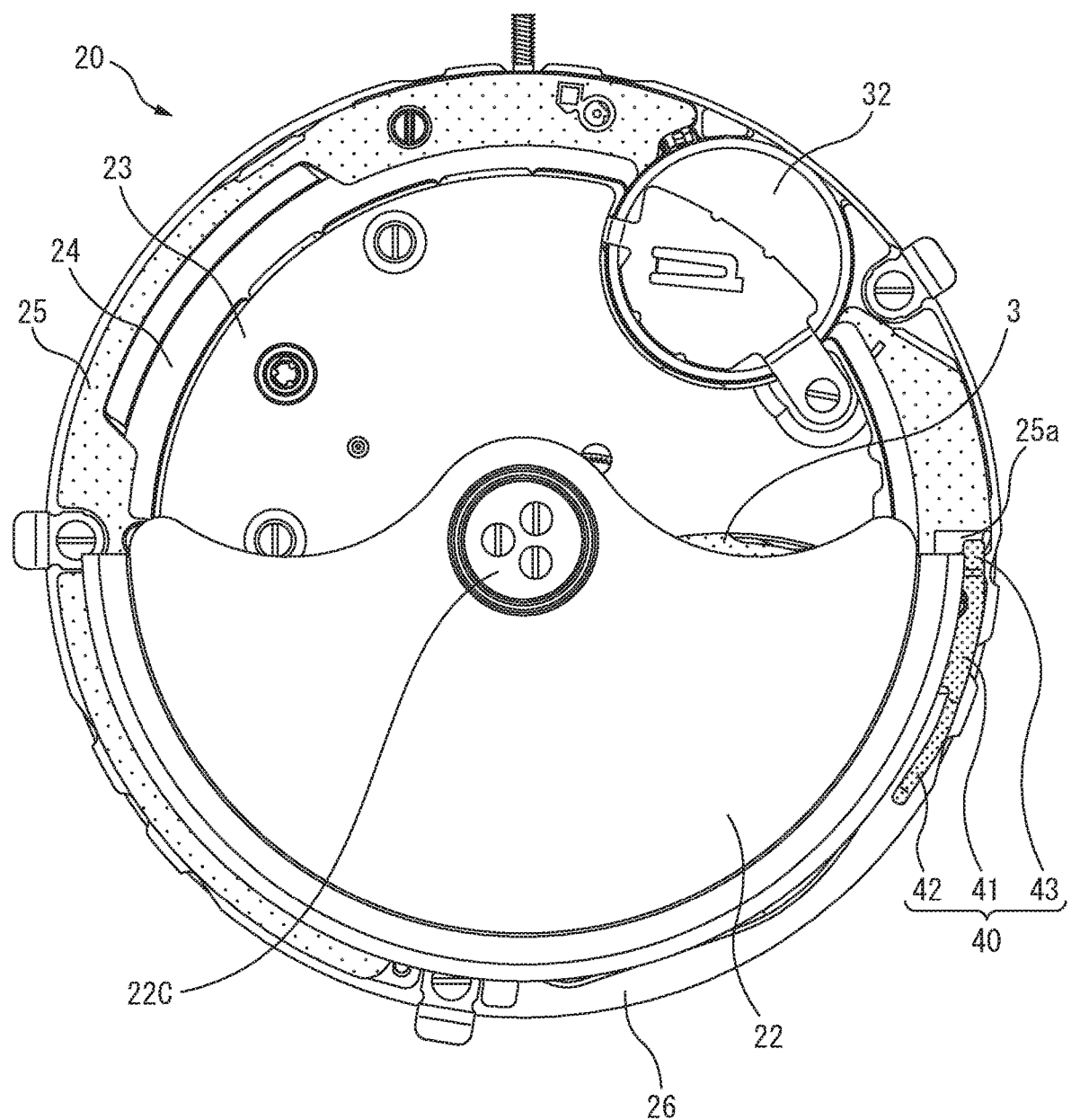
FIGS. 7-9 are plan views showing the internal structure of an electronic timepiece 20.
Figure 8:
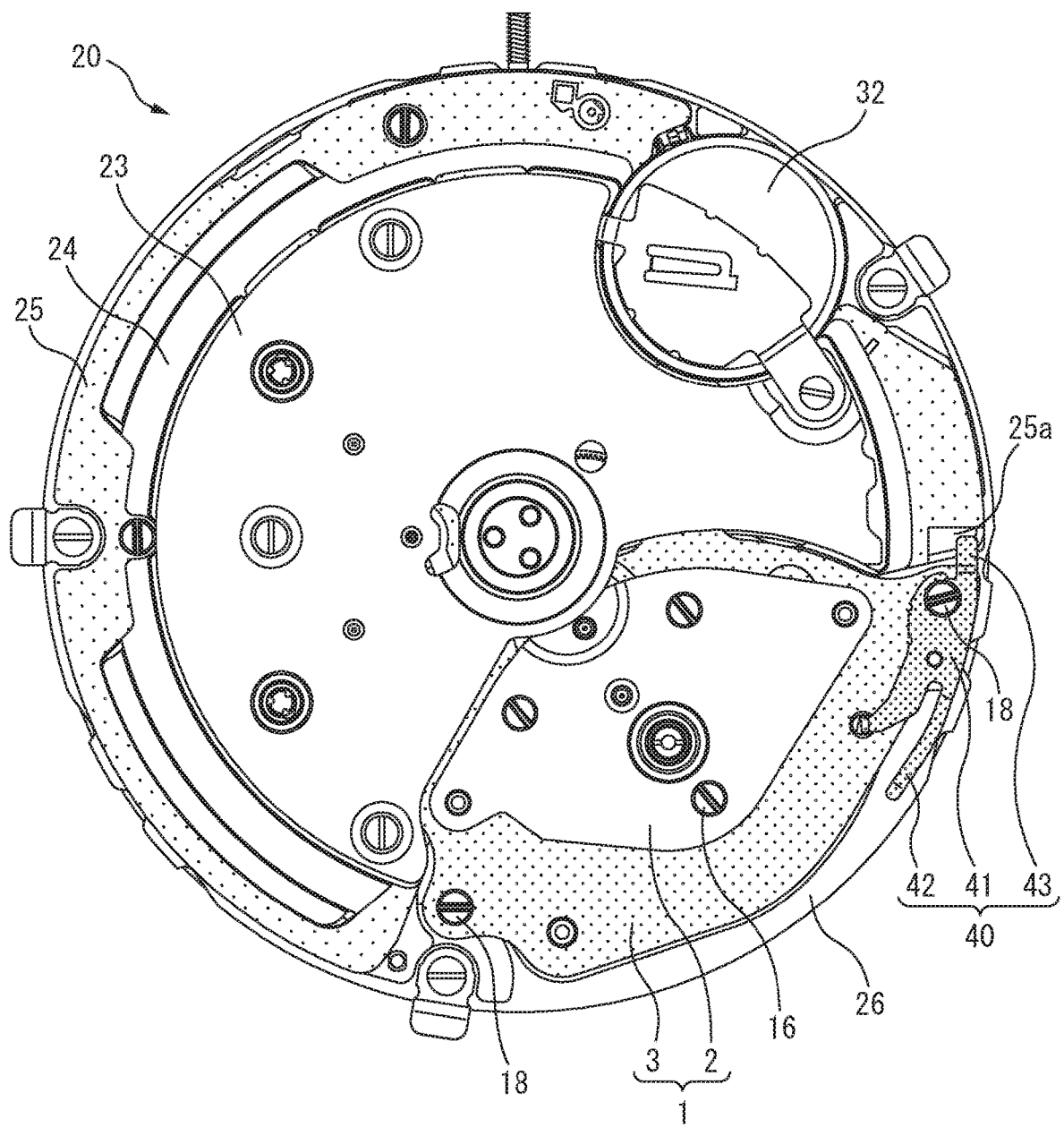
Figure 9:
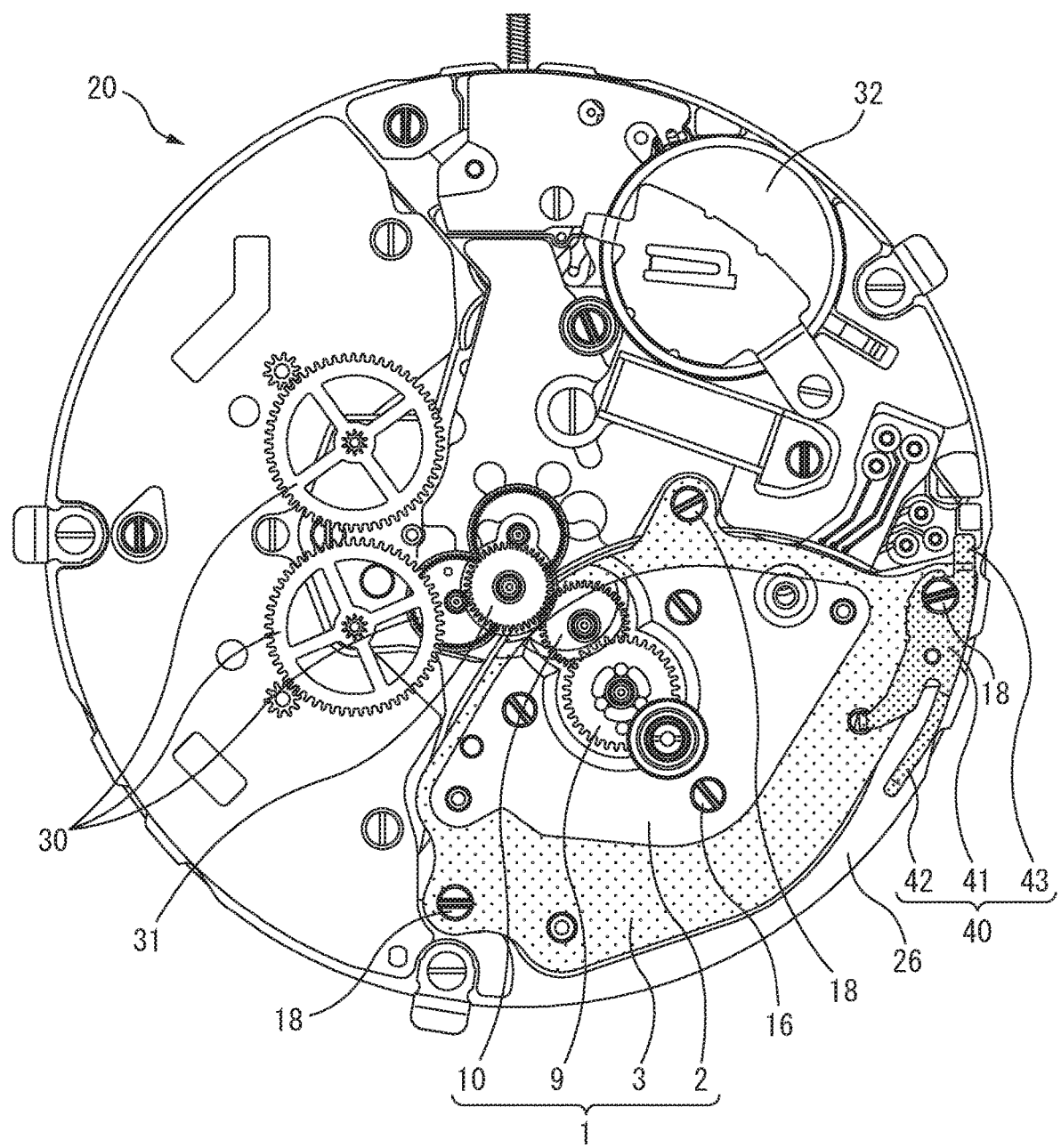
Figure 11:
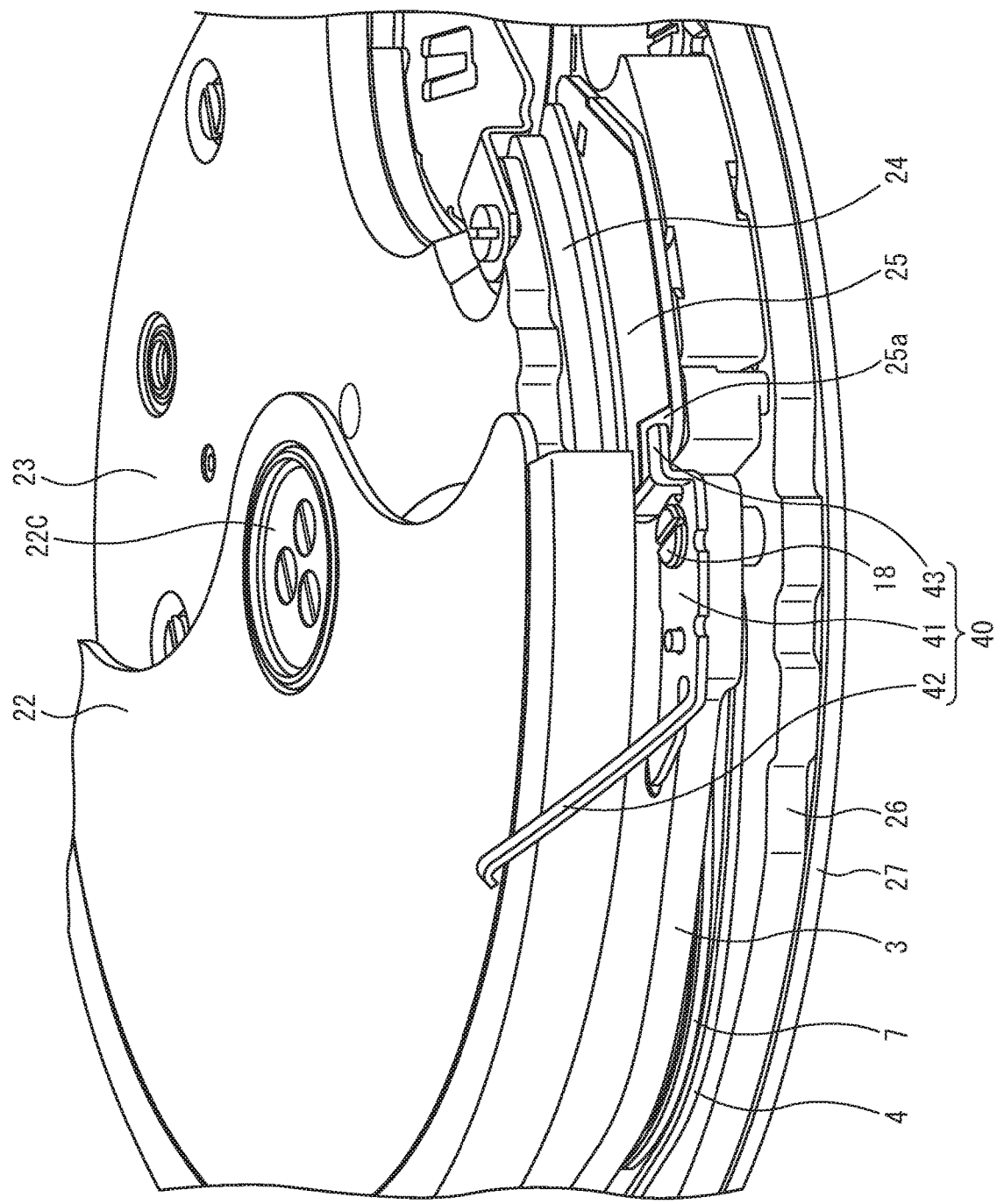
FIG. 11 is a perspective view showing part of the electronic timepiece 20 from which a case back 21 is removed.

An example where the module 1 is built into an electronic timepiece (wrist watch) will be described below. FIGS. 7-9 are plan views showing the internal structure of an electronic timepiece 20. FIGS. 10A and 10B are a schematic plan and cross-sectional views of the electronic timepiece 20, respectively. FIG. 11 is a perspective view showing part of the electronic timepiece 20 from which a case back 21 is removed. FIG. 10B shows a cross section of the electronic timepiece 20 taken along line XB-XB of FIG. 10A.

The electronic timepiece 20 includes a case back 21, a rotary weight 22, a bridge 23, a support 24, a circuit board 25, a main plate 26, a dial 27 and a protective glass 28 in this order in the thickness direction. FIGS. 7-9 are plan views of the electronic timepiece 20 as viewed from the side of the case back 21. In FIG. 7, the case back 21 is removed; in FIG. 8, the rotary weight 22 is further removed; and in FIG. 9, the bridge 23, support 24 and circuit board 25 are further removed. FIG. 9 shows the upper plate 2 of the module 1 as being transparent so that engagement between the gears can be seen.

The electronic timepiece 20 includes the module 1 at a position between the rotary weight 22 and main plate 26 in the thickness direction and beside the bridge 23, support 24 and circuit board 25 (lower right in FIGS. 7-9). The module 1 is built into the electronic timepiece 20 with the upper plate 2 and lower plate 4 facing the case back 21 and dial 27, respectively. In the illustrated example, the module 1 is used as a motor for driving hands. The gear 9 is a sixth wheel and pinion, while the gear 10 is a fifth intermediate wheel and is coupled to a fifth wheel and pinion 31. Although not shown, the electronic timepiece 20 also includes an electrostatic power generator which is similar to the transducer mechanism of the module 1.

The rotary weight 22 is a substantially semicircular flat member covering approximately half of the circular electronic timepiece 20, and is used for driving the unillustrated power generator. The rotary weight 22 is fixed to a rotating shaft 22C provided at the center of the electronic timepiece 20; its rotation area is substantially all the circular region of the electronic timepiece 20. The rotary weight 22 has an uneven weight balance due to its center of gravity displaced from the rotating shaft 22C, and uses fluctuations caused by motions of a user carrying the electronic timepiece 20, for example, as its power source, thereby rotating clockwise or anticlockwise around the rotating shaft 22C. The bridge 23 and support 24 are members for supporting the rotary weight 22 and bridge 23, respectively.

The circuit board 25 includes circuitry for applying an alternating voltage to drive the module 1 and thereby rotate the gear train. The main plate 26, the fifth wheel and pinion 31 mounted thereon, gears 30 coupled thereto, and other components constitute a movement of the electronic timepiece 20 (body of the watch mechanism). The module 1 and movement are coupled by the gear 10 (fifth intermediate wheel) and the fifth wheel and pinion 31. The electronic timepiece 20 rotates the fifth wheel and pinion 31 and the gears 30 by motive power received from the module 1, and thereby drives the hands to indicate the time.

Unlike the illustrated example, the module 1 may be used as an electrostatic power generator. In this case, the gear 10 of the module 1 is coupled to the rotating shaft 22C of the rotary weight 22 via another gear train (or directly), and is driven by rotation of the rotary weight 22. The circuit board 25 includes a circuit for rectifying an alternating current generated by driving the module 1 by rotation of the rotary weight 22, a circuit for charging a rechargeable battery 32 in the electronic timepiece 20 by using generated electric power, and a circuit for driving a motor (not shown) to drive the hands. The movement of the electronic timepiece 20 uses the stored electric power to drive the hands, thereby indicating the time.

A mechanism for grounding the circuit board 25 of the electronic timepiece 20 will be described below. Since circuit components, such as ICs, vulnerable to static electricity are mounted on the circuit board 25, it is necessary to electrically connect the circuit board 25 to the case back 21 or an outer case of the electronic timepiece 20 so that the static electricity can be discharged outside from the case back 21 or the outer case without conducting it to the circuit components. However, since a waterproof packing is generally sandwiched between the outer case and case back of a watch, conduction between them is not ensured. Further, bringing a grounding conductive member into contact with the side surface of the outer case lowers the workability of incorporating the movement into the outer case. Thus, it is more preferable to establish a grounding connection to the case back 21 than to the outer case.

As shown in FIG. 11, the electronic timepiece 20 includes a ground spring 40 as a conductive member for grounding the circuit board 25 to the case back 21. The ground spring 40 is made of a metallic material so as to conduct electricity, and includes a rigid portion 41, an arm portion 42 and a holding conductive portion (connecting portion) 43.

The rigid portion 41 is a flat body of the ground spring 40, and is placed on a surface of the middle plate 3 facing the case back 21 and fixed to the middle plate 3 by a screw 18. FIG. 9 shows the shape of the rigid portion 41 viewed from the side of the case back 21. If the case back 21 is defined as the top of the electronic timepiece 20, the middle plate 3 and rigid portion 41 are lower than the circuit board 25 (further from the case back 21), as shown in FIGS. 10B and 11. More specifically, the upper surface of the rigid portion 41 and the top part of the screw 18 which project from the surface of the middle plate 3 are disposed lower than the upper surface of the circuit board 25 (surface facing the case back 21).

In order to make the electronic timepiece 20 as thin as possible, the rotary weight 22 passes immediately above the circuit board 25 fixed on the movement. Since the electronic timepiece 20 is grounded to the case back 21, it is necessary to dispose the ground spring 40 away from the rotary weight 22 so that the rotary weight 22 may not bump into the ground spring 40. If the rigid portion 41 is disposed on the circuit board 25, it is necessary to separate the circuit board 25 and rotary weight 22 in the thickness direction or to thin the rotary weight 22 by the thickness of the rigid portion 41 and the top part of the fixing screw 18. However, the former makes the electronic timepiece 20 unnecessary thick, while the latter decreases rotational energy of the rotary weight 22 and makes the amount of generated power insufficient. Accordingly, in order to use the space above the circuit board 25 (on the side of the case back 21) for passing the rotary weight 22, the rigid portion 41 is disposed lower (closer to the dial 27) than the circuit board 25 in the thickness direction of the electronic timepiece 20 by an amount larger than the thickness of the rigid portion 41 and the top part of the screw 18 projecting thereon.

The module 1 is fixed to the main plate 26 (movement) by three screws 18 inserted into the three screw holes 18a of the middle plate 3 shown in FIG. 1. One of these three screws 18 is the screw fixing the rigid portion 41 of the ground spring 40. In other words, that screw 18 fixes the ground spring 40 to the module 1 and also fixes the module 1 to the movement. Use of a single screw for fixing the ground spring 40 and fixing the module 1 as described above allows for reducing the number of components of the electronic timepiece 20.

The arm portion 42 is a stick-like portion extending from an edge of the rigid portion 41 further from the circuit board 25 toward the case back 21 in an outer area inside the electronic timepiece 20, and is disposed outside the rotation area of the rotary weight 22 so that the rotary weight 22 may not bump into it. The arm portion 42 extends obliquely with respect to the thickness direction of the electronic timepiece 20 (vertical direction in FIGS. 10B, 11) so that it may have a sufficient length and not be easily broken; its end is in contact with the case back 21, as shown in FIG. 10B.

The holding conductive portion 43 extends vertically from the edge of the rigid portion 41 closer to the circuit board 25 and is bent along a step between the surfaces of the middle plate 3 and circuit board 25 so as to cover an edge of the circuit board 25. The holding conductive portion 43 holds the edge of the circuit board 25, and is connected to a conductive portion 25a on that edge. However, if the ground spring 40 can be in contact with the conductive portion 25a of the circuit board 25, the contact position may be arbitrary chosen without being limited to the edge of the circuit board 25; in this case, the shape of the holding conductive portion (connecting portion) may be different from the shape shown in FIG. 11. The circuit board 25 is grounded to the case back 21 by the holding conductive portion 43 and arm portion 42 which are in contact with the conductive portion 25a and case back 21, respectively.

FIG. 12 is a perspective view for explaining electrical paths connecting the module 1 and circuit board 25. As shown in FIG. 12, each of the upper substrate 5 and lower substrate 8 of the module 1 is electrically connected to the circuit board 25 via three coil springs 45. More specifically, the opposing electrodes 54-56 of the upper substrate 5 are connected to the circuit board 25 by three coil springs 45 on the three connecting terminals 57 in the projecting portion 53 (see FIG. 4A), while the opposing electrodes 84-86 of the lower substrate 8 are connected to the circuit board 25 by three coil springs 45 on the three connecting terminals 87 in the projecting portion 83 (see FIG. 6A). Since the module 1 is used as a motor for driving the hands in the electronic timepiece 20, driving pulses are inputted from the circuit board 25 via the coil springs 45 to the opposing electrodes 54-56, 84-86.

Although the repulsive force of the coil springs 45 causes force toward the case back 21 to act on the circuit board 25, the holding conductive portion 43 of the ground spring 40 holding the edge of the circuit board 25 also has the effect of preventing the connection between the upper substrate 5 and lower substrate 8 and the circuit board 25 from becoming unstable. Accordingly, the ground spring 40 also has the characteristics of suppressing the repulsive force of the coil springs 45, in addition to being fixed to the movement together with the module 1 and disposed away from the rotary weight 22 to establish a grounding connection to the case back 21.

Note that the middle plate 3 in the module 1 is not an essential member and may be omitted, and that the transducer mechanism and gearing mechanism may be disposed together between the upper plate 2 and lower plate 4.

The preceding description has been presented only to illustrate and describe embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. It is therefore intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. An electromechanical transducer to be detachably attached to an electronic device, the electromechanical transducer comprising:
    a first plate;
    a second plate;
    a rotor rotating around a rotating shaft supported by the first and second plates;
    a fixed substrate disposed between the first and second plates and facing the rotor;
    a charged portion having sub-regions disposed on the rotor at intervals in a rotating direction thereof so as to face the fixed substrate;
    an opposing electrode disposed on the fixed substrate so as to face the rotor;
    an adjusting unit for adjusting sliding properties of the rotating shaft, the adjusting unit being provided for at least one of the first and second plates; and
    a gear train coupled to the rotating shaft, wherein
    the gear train transmits motive power generated by the rotor rotated by electric power of the electronic device to the electronic device or transmits motive power generated by a change in orientation of the electronic device to the rotor.

2. The electromechanical transducer according to claim 1, wherein the adjusting unit comprises:
    an adjusting screw for adjusting the position of the rotating shaft in the longitudinal direction of the rotating shaft; and
    a resin portion surrounding the adjusting screw and having a thread formed by insertion of the adjusting screw to fix the adjusting screw.

3. The electromechanical transducer according to claim 1, wherein the adjusting unit is provided for each of the first and second plates.

4. The electromechanical transducer according to claim 1, further comprising a third plate between the first and second plates, wherein
    the gear train is disposed between the first and third plates while the rotor and the fixed substrate are disposed between the second and third plates.

5. The electromechanical transducer according to claim 4, wherein gears constituting the gear train rotate around second rotating shafts different from the rotating shaft, and
    the second rotating shafts are rotatably supported by the first and third plates at positions covered by a rotation area of the rotor as viewed from above.

6. The electromechanical transducer according to claim 4, wherein the rotating shaft of the rotor passes through the third plate and is rotatably supported by the first and second plates.

7. The electromechanical transducer according to claim 4, further comprising:
    a second fixed substrate disposed between the second and third plates on the side opposite to the fixed substrate with respect to the rotor;
    a second charged portion having sub-regions disposed on the rotor at intervals in the rotating direction so as to face the second fixed substrate; and
    a second opposing electrode disposed on the second fixed substrate so as to face the rotor.

8. The electromechanical transducer according to claim 7, further comprising
a spacer surrounding the rotor and sandwiched between the fixed substrate and the second fixed substrate, the spacer being at least partially translucent or transparent, wherein
the rotor is visible through the spacer from an area beside the first and third plates.

9. An electronic timepiece into which the electromechanical transducer according to claim 4 is built, the electronic timepiece comprising:
a circuit board including circuitry for applying an alternating voltage to the opposing electrode to generate electrostatic force between the charged portion and the opposing electrode, thereby rotating the rotor and the gear train; and
a movement coupled to the gear train and driving a hand by motive power generated by rotation of the rotor.

10. An electronic timepiece into which the electromechanical transducer according to claim 4 is built, the electronic timepiece comprising:
a rotary weight having an uneven weight balance and rotated by external force;
a circuit board including circuitry for storing electric power generated by electrostatic induction between the charged portion and the opposing electrode when the rotor is rotated by rotational energy of the rotary weight; and
a movement using the stored electric power to drive a hand, wherein
the gear train is directly or indirectly coupled to a rotating shaft of the rotary weight.

11. An electromechanical transducer using electrostatic interaction between a charged portion and an opposing electrode to perform transduction between electric and motive power, the electromechanical transducer comprising:
a first plate;
a second plate;
a third plate between the first and second plates;
a fixed substrate between the second and third plates;
a rotor facing the fixed substrate and rotating around a rotating shaft;
a charged portion having sub-regions disposed on the rotor at intervals in a rotating direction thereof so as to face the fixed substrate;
an opposing electrode disposed on the fixed substrate so as to face the rotor; and
a gear train disposed between the first and third plates and coupled to the rotating shaft.

12. The electromechanical transducer according to claim 11, further comprising:
a second fixed substrate disposed between the second and third plates on the side opposite to the fixed substrate with respect to the rotor;
a second charged portion having sub-regions disposed on the rotor at intervals in the rotating direction so as to face the second fixed substrate; and
a second opposing electrode disposed on the second fixed substrate so as to face the rotor.

13. The electromechanical transducer according to claim 11, wherein gears constituting the gear train rotate around second rotating shafts different from the rotating shaft, and the second rotating shafts are rotatably supported by the first and third plates at positions covered by a rotation area of the rotor as viewed from above.

14. The electromechanical transducer according to claim 11, wherein the rotating shaft of the rotor passes through the third plate and is rotatably supported by the first and second plates.

15. The electromechanical transducer according to claim 12, further comprising
a spacer surrounding the rotor and sandwiched between the fixed substrate and the second fixed substrate, the spacer being at least partially translucent or transparent, wherein
the rotor is visible through the spacer from an area beside the first and third plates.

16. An electronic timepiece comprising:
the electromechanical transducer according to claim 11;
a circuit board including circuitry for applying an alternating voltage to the opposing electrode to generate electrostatic force between the charged portion and the opposing electrode, thereby rotating the rotor and the gear train; and
a movement coupled to the gear train and driving a hand by motive power generated by rotation of the rotor.

17. An electronic timepiece comprising:
a rotary weight having an uneven weight balance and rotated by external force;
the electromechanical transducer according to claim 11, wherein the gear train is directly or indirectly coupled to a rotating shaft of the rotary weight;
a circuit board including circuitry for storing electric power generated by electrostatic induction between the charged portion and the opposing electrode when the rotor is rotated by rotational energy of the rotary weight; and
a movement using the stored electric power to drive a hand.

18. The electronic timepiece according to claim 16, further comprising a conductive member for grounding the circuit board to a case back of the electronic timepiece, the conductive member comprising:
a rigid portion disposed on the third plate;
an arm portion extending from the rigid portion to the case back in an outer area inside the electronic timepiece; and
a holding conductive portion extending from the rigid portion to a conductive portion of the circuit board and holding the circuit board.

19. The electronic timepiece according to claim 18, wherein the rigid portion is fixed to the third plate by a screw, and
the third plate, and the rigid portion and a top part of the screw projecting from a surface of the third plate are further from the case back in the thickness direction of the electronic timepiece than a surface of the circuit board facing the case back.

20. The electronic timepiece according to claim 19, wherein the screw fixes the conductive member to the electromechanical transducer and also fixes the electromechanical transducer to the movement.

* * * * *